United States Patent Office 3,674,506
Patented July 4, 1972

3,674,506
FORMING A FILLED EDIBLE CASING
Eugene D. Schilling and Phyllis I. Burchill, Minneapolis,
Minn., assignors to General Mills, Inc.
No Drawing. Filed Mar. 18, 1970, Ser. No. 20,799
Int. Cl. A22c 11/00, 13/00
U.S. Cl. 99—109          16 Claims

ABSTRACT OF THE DISCLOSURE

Preparation of filled edible casing by extruding edible plastic mass of non-heat coagulable simple protein and water in the form of a casing and introducing an edible flowable material into the casing as said casing is being formed.

---

The present invention relates to a process for preparing packaged materials. More particularly, it relates to the process of introducing a filling into certain protein based casings as the same are being formed by extrusion.

It has recently been discovered that non-heat coagulable simple proteins could be used to form plastic masses which could be extruded directly into a gaseous medium to form casings for sausages and the like. Distinctly valuable proteins for this purpose are keratin and gluten and mixtures thereof with one or more other proteins.

These recent discoveries provide advantages to the art by setting forth practical procedures for forming casings from proteins which are edible and which have certain other desirable characteristics. However, such discoveries involve the extrusion and formation of the casing for subsequent use, such as by stuffing with sausage formulations and the like.

We have now discovered that edible protein based casings can be filled with various flowable materials as they are being formed. The process of our invention comprises (1) forming an extrudable plastic mass from a liquid comprising water and a proteinaceous substance comprising a particulate non-heat coagulable simple protein source material having a protein content of at least about 65% by weight and (2) simultaneously (A) extruding the plastic mass through an annular die into a gaseous medium to form a casing substantially free of voids and (B) introducing a flowable material into the center of the forming casing, such flowable material substantially filling the interior of the casing. Our invention eliminates the need for the handling, shirring and storage of unfilled casings.

As indicated, the extrudable plastic mass to be used in the casing formation is comprised of a liquid and a proteinaceous substance. The weight ratio of protein to liquid (not including liquid plasticizers if such are used) in the extrudable plastic masses is from about 1:4 to 6:1, dependent somewhat on the particular proteinaceous substance employed.

The primary or only constituent of the proteinaceous substance is the particulate non-heat coagulable simple protein source material having a protein content of at least about 65% by weight and preferably at least about 75% by weight. Simple proteins are defined at pages 30 and 31 of "Processed Plant Protein Foodstuffs" by Aaron M. Altschul, 1958, Academic Press Inc., 111 Fifth Avenue, New York, N.Y. The globulins, prolamines and scleroproteins are preferred for use in the present invention out of the general group of non-heat coagulable simple proteins. The properties of the casings will vary somewhat dependent on the particular simple protein or proteins used in the formation of the plastic masses. Thus, for example, the strength, extensibility or flexibility and nutritional value of the casings will vary with the selection of the starting particulate simple protein or proteins.

Various of the indicated protein source materials are commercially available or can be prepared by known procedures. Wheat gluten, for example, is obtained by separating it from wheat by any convenient means and the same is readily available commercially. Spray dried and flash dried wheat gluten are commercially available forms suitable for use in the invention. One preferred commercially available wheat gluten product is Pro-80. This product is a flash dried vital wheat gluten which may contain several percent moisture and on a moisture-free basis consists of about 80% vital wheat gluten, 5–10% fat and 10–15% starch. It is preferred that the gluten source contains at least about 80% vital wheat gluten, with the remainder being diluent materials such as residual fat or lipid, starch, flour and the like. Wheat gluten source materials containing up to about 35% of diluent materials can be used provided that the over-all protein to liquid ratio is obtained and the diluent materials do not render the dough unextrudable or adversely affect the desired properties of the shaped articles to an excessive extent.

The keratin protein useful in the process of the present invention can be isolated from the natural sources thereof by various known procedures which preferably include the use of a reducing agent. The reducing agent appears to perform a variety of functions including increasing of the solubility or dispersibility of the keratin and/or improving the odor and/or flavor of the recovered isolate. When used during the initial isolation step, the reducing agent apparently increases the solubility or dispersibility of the keratin by breaking various disulfide bonds, both in the polypeptide chains (intrachain) and in the cross-linking of different polypeptide chains (interchain). When an alkali metal sulfide is used as the alkaline solubilizing agent, the keratin which is subsequently acid precipitated often has a bad odor indicating that hydrogen sulfide is being given off. Additionally, hydrogen sulfide may be given off during the precipitation step itself. In this instance, a reducing agent, such as an alkali metal sulfite appears to not only break some disulfide bonds but also to yield sulfurous acid which reacts with the hydrogen sulfide and any free sulfur formed during the sulfide solubilization or subsequent precipitation of the keratin. The products resulting from this reaction are theorized to be water soluble compounds such as $H_2S_2O_3$, $H_2S_3O_6$ and/or $H_2S_4O_6$. These compounds are not volatile and do not precipitate with the protein on addition of the acid precipitating agent.

One preferred procedure for isolating the keratin, as indicated above, comprises extracting same from the natural sources with an aqueous alkali metal sulfide solution, treating the resulting aqueous extract with an alkali metal sulfite and then precipitating the protein by the addition of an acid. The resulting product may also be dried if desired. This process can be used to recover keratin protein from any naturally occurring keratin source material, and is particularly valuable in the recovery of high quality keratin protein from feathers.

The first step of this preferred procedure is to extract the keratin source material with an aqueous solution of an alkali metal sulfide. Representative sulfides are sodium sulfide and potassium sulfide. Preferably the keratin source is in a relatively sub-divided form to promote the extraction. For example, whole feathers can be extracted with the sulfide solution but better extraction is obtained if the feathers are cut into smaller pieces. The extraction is preferably carried out at temperatures of about 20 to 50° C. The alkali metal sulfide is preferably used in an amount of about 2.5 to 20% by weight based on the weight of the material being extracted. It is also preferred to use relatively dilute solutions of the alkali metal sulfide. In this way the extracted keratin protein is more readily dissolved in the extracting medium. Thus the aqueous solutions preferably contain from about 0.25 to 2% by weight of the alkali metal sulfide and enough of the solution is used so that the concentration of the extracted keratin protein therein remains below about 15% by weight, and is preferably in the range of 1 to 10% by weight. Sodium sulfide ($Na_2S$) is the preferred extractant.

The protein containing solution is separated from the insoluble residue by conventional means such as decantation, filtration or the like. The insoluble residue can be further extracted or washed with water or fresh aqueous sulfide solution and the resulting liquids can be treated separately or combined with the first obtained protein containing solution. In this way, the ultimate yield of protein is increased somewhat although the major amount of the protein is normally obtained in the initial extraction step.

The protein containing solution is next treated with the alkali metal sulfite. Representative sulfites are sodium and potassium sulfite and bisulfite. A preferred treating agent is sodium sulfite ($Na_2SO_3$). The alkali metal bisulfites, such as sodium bisulfite ($NaHSO_3$), are less preferred since they release sulfur dioxide at a faster rate and thus may cause some localized premature precipitation unless added at a slower rate than the sodium sulfite. The sulfite is used in a molar excess in relation to the amount of alkali metal sulfite used in the initial extraction step. Preferably the molar ratio of the sulfite to the sulfide is in the range of 1.01–10.0:1.0. The sulfite in dry form or in the form of an aqueous solution thereof is simply added to the protein containing solution in the designated amount. The protein containing solution can be stirred during or after the addition to effect a more uniform distribution of the sulfite therein.

After the described sulfite treating step, the protein is precipitated by the addition of acid in the conventional manner. Any of a variety of inorganic or organic acids can be used. Representative acids are hydrochloric acid, sulfuric acid, acetic acid, phosphoric acid and the like. The acid is used in an amount sufficient to lower the pH of the protein containing solution to the isoelectric point or below of the protein. Preferably, the pH is reduced to below about 4.5 and the range of 3.0 to 4.5 is especially suitable.

The precipitated protein is separated from the protein barren liquid by conventional techniques—i.e., decantation, filtration and the like. In all of the steps of the process the temperature is not critical but is preferably in the range of 20 to 50° C.

The precipitated and separated protein can be dried if desired. Any conventional drying technique can be used—i.e., spray, drum, tray, freeze or the like. The resulting keratin protein is a high quality product having good odor, color and flavor characteristics.

The following specific examples will serve to illustrate this preferred process of recovering the keratin from natural sources.

EXAMPLE A

One hundred grams of cut turkey feathers were added to 1333 ml. of an aqueous solution of sodium sulfide (the solution consisted of water and 32 g. $Na_2S \cdot 9H_2O$). The resulting mixture was held at 40° C. for two hours and then centrifuged for 20 minutes at 2000 r.p.m. The supernatant liquid was decanted and saved. The residue was mixed with 1333 ml. water and then centrifuged as above. The second supernatant liquid was decanted and saved. The residue was discarded. Each of the supernatant liquids was made 0.3 molar with respect to sodium sulfite (50.4 g. sodium sulfite added to each). The pH of each of the liquids was adjusted to pH 4.2 by the addition of 6 N hydrochloric acid (the first required 81 ml. and the second 53 ml. of the acid). During the acidification of the liquids no hydrogen sulfide was liberated and no sulfur dioxide odor was noted. The resulting precipitates were separated from the liquids by centrifugation and washed once with 0.01 N hydrochloric acid (one liter) and 3 times with one liter portions of acetone. The protein was then allowed to air dry at room temperature. There was obtained 60.4 g. protein from the first supernatant liquid and 8.1 g. protein from the second supernatant liquid. The protein was light colored, bland and substantially odor free.

EXAMPLE B

Keratin was isolated from chicken feathers by the following pilot plant scale operation. Forty-five and one-half pounds of clean, dry chicken feathers were mixed with 75 gal. water containing 8.1 lbs. of commercial grade sodium sulfide (60% $Na_2S$). The temperature of the mixture was 103° F. The mixture was agitated for two hours and the temperature of the resulting digest mixture was 98° F. The digest was passed through a coarse screen to remove pieces of the undigested feather residue. To the digest was added 90 gal. water containing 23.6 lbs. commercial grade sodium sulfite. The pH of the digest was lowered to 8.2 by adding 100 lb. 1 N hydrochloric acid. The digest was then filtered through a filter press using 28 lbs. filter aid and a 1 x 1 filter cloth. The filtering time was 2 hours. The clear amber filtrate collected was pH 8.7. To the filtrate was added 190 lbs. 1 N HCl over about 130 min. to lower the pH to 4.2. The resulting protein precipitate was allowed to settle overnight, and the supernatant liquid was removed. The precipitate was washed with 60 gal. water and allowed to settle in the supernatant wash water for 5 hrs., after which time the supernatant liquid was removed. An additional 60 gal. water was added to the precipitate and allowed to stand overnight. The supernatant liquid was removed and the protein precipitate was collected by filtering. The protein cake thus formed was freeze dried to yield 11.55 lbs. of dry keratin protein.

Additional processes or procedures, other than the preferred one described above, may be used to isolate keratin in a form suitable for use in our invention. One such procedure involves digesting keratin source materials (e.g. poultry feathers) in an alcohol-water mixture which contains ammonium sulfite. In another satisfactory process for obtaining keratin suitable for use in our invention, keratin source materials are digested in a mercaptoethanol-alcohol-water mixture and filtered to remove impurities, and the keratin is obtained by centrifugation of the resulting gel mixture. In a further satisfactory process of obtaining keratin, the latter method is followed, except that the mercaptoethanol-alcohol-water mixture is made alkaline by the addition of a base such as sodium hydroxide, potassium hydroxide and the like. In these procedures for isolating keratin, the ammonium sulfite and mercaptoethanol reducing agents act primarily as aids for increasing the solubility or dispersibility of the keratin protein.

Other preferred non-heat coagulable simple proteins are available commercially. Thus particulate collagen is available, one suitable product being Avitene H microcrystalline collagen. Various isolates and concentrates derived from oilseeds, and particularly soybeans are readily commercially available or prepared by known methods—i.e., alkaline extraction of defatted meals followed by acid precipitation. One such commercially available product is Promine R, such product being soy isolate having a protein content of approximately 95% by weight. Leaf proteins are also available and can be prepared by known procedures similar to those used in isolating proteins from oilseed meals or flours. Various procedures are set forth in the above-referred to book "Processed Plant Protein Foodstuffs" at pages 54 and 55.

In general, it is theorized that upon extrusion of the plastic mass into the gaseous medium, various bonds are formed or reformed between the molecules of the proteins Excessive diluent materials appear to inhibit the formation of such bonds and thus the proteinaceous substance should have a protein content of at least about 65% and preferably 80% and higher. Additionally, the protein should not be excessively denatured, either chemically or physically by heat, since denaturization also inhibits the formation or reformation of bonds between the protein molecules.

As indicated above, the proteinaceous substance is comprised mainly or solely of the described non-heat coagulable simple protein or proteins. However, it is possible and within the scope of the invention to use other proteins in combination with the non-heat coagulable simple protein or proteins to obtain certain properties. Thus, phosphoproteins (a member of the conjugated protein group) can be used, for example, to effect changes in the water solubility of the shaped articles. Such other proteins are used in an amount less than about 50% by weight of the total proteinaceous substance and preferably in an amount of less than about 30% by weight.

The extrudable plastic masses may also contain extrusion aids such as reducing agents and bases, alcohols, plasticizing agents and the like.

The reducing agents and bases improve or optimize the extrudability of the non-heat coagulable simple protein containing plastic masses. It is theorized that the above agents improve the extrudability of the plastic masses by attacking various chemical forces in the proteins. The reducing agents are thought to aid in creating relatively homogeneous extrudable masses mainly by their action of cleaving disulfide bonds in the protein molecules or polypeptides thus increasing the dispersibility of the protein. It is also believed that such cleavage yields sulfhydryl groups on the proteins which later regenerate new bonds when exposed to the gaseous medium upon extrusion of the plastic mass. Accordingly, the incorporation of a reducing agent or agents in the compositions has the effect of temporarily cleaving various disulfide bonds of the protein or proteins such that more homogeneous extrudable plastic masses are formed but such that new disulfide bonds may regenerate upon extrusion to aid in forming strong, flexible shaped articles.

Any of a wide variety of reducing agents may be used in the formation of the extrudable plastic masses. Representative reducing agents are mercaptans such as mercaptoethanol, cysteine, cysteamine and the like, ascorbic acid, ammonium sulfite and the alkali metal sulfites, bisulfites, and nitrites such as sodium sulfite, sodium bisulfite and sodium nitrite. Especially preferred water soluble reducing agents are sodium sulfite and ammonium sulfite.

Other agents which find use as extrusion aids in forming the relatively homogeneous plastic masses include bases. Such basic substances are believed to aid in forming the extrudable masses by lessening or negating the effect of hydrogen bonding among polar groups in the protein polypeptides and/or lessening certain charge interactions of ionized residues in the protein which contribute to the protein's cohesive character. A wide variety of organic and inorganic bases may be used including amines, hydroxides, oxides, basic salts and the like. The preferred bases are the water soluble hydroxides, and especially the alkali metal hydroxides—i.e., sodium and potassium hydroxide—and ammonium hydroxide. Ammonium hydroxide is the preferred base due to its volatility which encourages more immediate drying of the freshly extruded products. Its use also eliminates the necessity of a neutralization step to obtain a product of near neutral pH.

It is preferred to include an exrusion aid in the extrudable compositions. As such the same is used in an amount sufficient to aid in the formation of a relatively homogeneous extrudable plastic mass from the protein and liquid. In this respect, the optimum amount will vary somewhat depending on whether the extrusion aid is a reducing agent or a base or both and also as to the precise such agent used. The reducing agent will preferably be used in an amount of about 0.1 to 5.0% by weight based on the weight of the protein. The base will preferably be used in an amount of about 0.1 to 45% by weight based on the weight of the protein. As indicated above sodium sulfite is a preferred reducing agent and is preferably used in an amount of about 0.1 to 2.0% by weight based on the weight of the protein. The preferred base is ammonium hydroxide as indicated above. It is especially preferred to use a combination of the two extrusion aids in the preparation of the shaped articles.

Monohydroxy aliphatic alcohols may also be included in the extrudable mixtures. When used in combination with the above-described extrusion aids, such alcohols also aid in the dispersing of the protein in the plastic masses presumably by lessening the effect of hydrophobic bonding among non-polar residues in the protein. The alcohols contain less than about 10 carbon atoms and preferably contain 1 to 4 carbon atoms. Illustrative of the preferred alcohols are methanol, ethanol, isopropanol, propanol, n-butanol and the like. While alcohols containing more than five carbon atoms may be used, they are not preferred since they tend to cause the need for higher temperatures to form a plastic mass which is homogeneous, non-waxy and suitable for extrusion. Ethanol is an especially preferred alcohol for use. The alcohol can be used to replace up to about 95% by volume of the water in the liquid portion of the extrudable compositions.

Certain ingredients may be included in the extrudable compositions which impart increased flexibility to the extruded shaped articles. Such ingredients may be termed "plasticizers," and include a variety of polyols and higher molecular weight alcohols such as glycerol, propylene glycol, diglycerol, polyethylene, glycols, 1,2,6-hexanetriol, triethanolamine, and the like. Where food applications are sought for products prepared in accordance with this invention, plasticizers should not be used which would impart undesirable odor or taste to the products. Preferred plasticizers comprising glycerol, diglycerol, propylene glycol and 1,2,6-hexanetriol. For example, glycerol has been used in amounts up to about 50% of the weight of the protein, although amounts up to about 33% are preferred.

When no plasticizer is included in the compositions, initially flexible and expansible casings may be extruded. However, such casings tend to become somewhat brittle upon drying. Thus where it is desired to form casings which will retain their flexibility, it is necessary either to include a plasticizer in the extrudable plastic mass or to subject the extruded and filled casing to a plasticizing treatment. Where a plasticizer is included in the extrudable composition, enough should be used that the desired flexibility is attained. Thus where a plasticizer is included, it is preferred that the weight ratio of protein to plasticizer be about 5:1 to 2:1.

When desired flexibility in the extruded and filled casing is achieved by subjecting the same to a plasticizing treatment, means serving to bring the plasticizer in contact with the filled casing will serve this result. For example, a solution of about 10 to 80% by weight glycerol in water or up to 95% ethanol provides a suitable plasticizing bath to which the extruded and filled casings may be subjected.

Still further variations of the present invention include the use of inert materials and other modifying agents and additives. One such modifying agent is citric acid which tends to improve the wet strength of the casings.

The extrudable plastic mass is prepared by mixing and heating the above-described ingredients. Such mixing can be carried out by hand or with the aid of any commercially available mixing machines. The ingredients are heated to temperatures sufficient to form the relatively homogeneous extrudable plastic mass and such temperatures are essentially maintained until the mass is extruded. The temperature is kept below the point where the mass, upon extrusion, would puff to any appreciable extent since such puffing would result in voids or holes in the casing. Temperatures in the range of about 70 to 190° C. are preferred for the formation of the extrudable plastic mass and the subsequent extrusion.

The plastic mass can be formed and extruded in one operation by using an extruder equipped with means for mixing and heating the ingredients and a screw to continuously advance the forming mass to the extrusion orifice. On a laboratory scale (i.e. up to several hundred grams) it is convenient, but not necessary, to first mix the ingredients other than the protein and then to mix in the protein. Such pre-mixing is essentially complete in a few minutes—i.e. one to about five minutes. The ingredients are then heated to the temperatures needed to form the extrudable plastic masses and extruded. The pre-mixed ingredients form compositions which can often be further characterized as "sticky." In other instances the compositions can be further characterized as being "crumbly" or "granular," depending somewhat upon the particular protein or proteins used, and upon the specific ratio of protein to liquid in such compositions. The pre-mixed ingredients may be stored for substantial periods by means which prevent evaporation of liquid portions of the mixtures. It is often convenient to allow the mixtures to stand for at least a few minutes to encourage more thorough wetting of the protein.

In the examples which follow, a Brabender type 200 extruder was used. This extruder has three zones in which heat can be applied to the ingredient mixture. In the first zone, the first portion of the extruder barrel, the mixture is heated to a temperature lower than that of the succeeding zones, and between about 30° C. and 85° C. In the second zone, the second portion of the extruder barrel, the temperature during extrusion is maintained at between about 40° C. to about 190° C., and in the third zone, the extruder die, the temperature is about 70° C. to about 190° C. As indicated above, enough heat is needed to encourage thorough mixing, reacting and dispersing of the ingredients, but if the resulting plastic mass is too hot, flashing of the solvents or puffing may occur upon extrusion, resulting in voids, bubbles and/or weak spots in the casing.

Ordinarily and preferably, the plastic mass is extruded into air or other gaseous medium at ambient room temperatures and at atmospheric pressure. Of course, sufficient pressure is applied to the hot plastic mass to force same through the extrusion die or orifice. In other respects, the extrusion pressure is not critical. Although no reason is seen for doing same, the extrusion of the plastic mass can be into air or other gaseous medium at pressures higher or lower than atmospheric pressure. Where such pressures are higher than atmospheric pressure, a somewhat higher mass or hot melt temperature than the preferred ranges set forth above may be accommodated without causing flashing of the solvent or puffing in the extruded product. However, even with such higher pressures, the temperature of the plastic mass should not be so high as to decompose or unduly degrade the protein or other ingredients of the mass or cause charring thereof. Extrusion into atmospheres having pressures lower than atmospheric pressure can also be used. However, while some reduction in the temperature could be made, the temperature still must be sufficient to yield the relatively homogeneous extrudable plastic mass. The medium into which the plastic mass is extruded is preferably and most practically maintained at ambient room temperature. However, higher or lower temperatures can be used if desired.

The plastic mass is extruded through an annular die. Such die preferably yields a tube having an inner diameter of about 5 to 100 mm. and an initial wall thickness of about 0.25 to 50 mils.

As indicated, our invention involves the simultaneous (A) extrusion of the above-described extrudable plastic masses and (B) the introduction of a flowable material into the interior of the forming casing. The flowable material is introduced in an amount such that the interior of the forming casing is substantially filled with the same. By flowable material we mean any non-gaseous substance capable of flowing under gravity or under pressure including liquids which may be solutions, dispersions, emulsions or the like, gels, semi-solids and solids. It is understood, of course, that the flowable material should be a substance which does not interfere to any appreciable extent with the formation of the substantially continuous casing and which does not dissolve or degrade the formed casing to any significant degree.

Representative of the wide variety of flowable materials which may be used in our process are: water, corn syrup, liquid oils, gelatins as commonly prepared in the home from commercially available packaged mixes, jams, jellies, meat emulsions, mustard, tomato sauces, puddings, peanut butter, cookie doughs and the like. Our invention has particular advantage in the use of edible substances as the flowable materials since the protein based casings are also edible.

The flowable materials are introduced into the interior of the forming casing through an orifice located in the central portion of the annular extruder die. Where the material is a liquid, it may simply be allowed to flow into the interior of the forming casing. Of course, in order to confine the liquid, the end of the forming casing is sealed, such as through the use of a clamp or other physical or chemical means—i.e. an adhesive. The liquid may also be introduced under pressure thus causing the sealed, forming casing to expand laterally. The pressure should not be so great as to cause rupture of the casing film. The amount of expansion will depend somewhat on the particular plastic mass being extruded and especially on the particular protein used in preparing the plastic mass. Thus where the plastic masses are prepared solely or principally from keratin or gluten, considerable lateral expansion of the forming casing is possible. However, where soy protein, collagen, or leaf proteins are used, the lateral expansion must be reduced since the strength of the casing is less than with keratin or gluten. It is preferred that the tubes are expanded to from about 0 to 10 times their initial diameter.

Where the flowable material is a substance other than a liquid, it is introduced under pressure sufficient to cause same to substantially fill the interior of the forming casing and produce any desired lateral expansion as above described.

The temperature of the flowable material should not be so high as to destroy or impede the formation of the casing to any great extent. However, the casing forms almost immediately upon extrusion and thus the flowable material may have a temperature considerably higher than that of the plastic mass in the extruder. For foods, temperatures in the range of the temperatures used in forming the plastic mass have been found to be entirely suitable although they need not be limited thereto.

The formed and filled casing prepared in accordance with our invention can be cut to any desired lengths. Where the flowable material is a liquid, the pieces or segments would be sealed at each end such as by pinching, clamping or the like. Semi-solid and solid filled casings are also preferably sealed at both ends. Further treatments would include curing of casings wherein the flowable material is a sausage emulsion.

The following examples, which are not to be considered as limiting illustrate preferred embodiments of the present invention.

Example I

To a Waring Blendor containing 70 g. feather keratin as prepared by the method of Example B and 30 g. isolated soy protein (Promine D) was added a solution of 60 ml. water, 20 ml. 6 N ammonium hydroxide, 3 g. sodium sulfite and 50 g. glycerol. The ingredients were thoroughly mixed, and the resulting composition was formed into a plastic mass and extruded by the Brabender extruder operated at 95 r.p.m. and equipped with a 40 mil annular die having a diameter of ½ inch. The temperatures in the three zones of the extruder were 80° C., 100° C. and 90° C., respectively. The emerging end of the forming casing was sealed by being pinched together and a commercial frankfurter emulsion (at 25° C.—diluted 1:1 by vol. with water) was simultaneously introduced into the forming casing by forcing the emulsion through a ⅛ inch diameter orifice in the center of the annular die. The casing integrity was maintained with the frankfurter emulsion substantially filling the casing. The casing could be expanded laterally by increasing the pressure used in causing the emulsion to flow into the casing. The increased quantity of emulsion thus expands the casing.

Example II

Example I was essentially repeated except that the plastic mass was formed from a pre-mixed composition made up of 100 g. vital wheat gluten (Pro-80), 64 ml. water, 20 ml. ammonium hydroxide, 0.5 g. sodium sulfite and 33 g. glycerol, and the temperatures in the three zones of the extruder were 50° C., 120° C. and 105° C., respectively. Substantially the same good results were obtained.

Example III

Example I was essentially repeated except that a mixture of 311 g. peanut butter and 56 g. vegetable oil was used as the flowable material and the extruder was operated at 26 r.p.m. using a ⅛ inch diameter annular die and the temperatures in the three zones were 80° C., 100° C. and 100° C., respectively. Good casings filled with the peanut butter composition were obtained.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. The process of preparing a filled edible casing which comprises: (1) forming a relatively homegeneous, aqueous, extrudable, plastic mass by mixing and heating a composition consisting essentially of (a) a proteinaceous substance comprising at least about 50% by weight of a particulate, non-heat coagulable simple protein material and (b) a liquid comprising water, wherein the protein to liquid weight ratio is in the range of about 1:4 to 6:1, both the proteinaceous substance and the simple protein material have protein contents of at least about 65% by weight and the composition is heated to temperatures of at least about 70° C. but below the decomposition temperature of the protein contained therein and below the point where the mass upon extrusion would puff to any appreciable extent; and (2) simultaneously (A) extruding the plastic mass into a gaseous medium in the form of a tubular casing substantially free of voids and (B) introducing an edible flowable material into the center of the forming casing, such flowable material substantially filling the interior of the casing.

2. The process of claim 1 wherein the composition also contains an extrusion aid selected from reducing agents and bases or combinations thereof.

3. The process of claim 2 wherein the extrusion aid is a reducing agent and such reducing agent is present in an amount of about 0.1 to 5.0% by weight based on the weight of the protein in the composition.

4. The process of claim 3 wherein the reducing agent is sodium sulfite.

5. The process of claim 2 wherein the extrusion aid is a base and such base is present in an amount of about 0.1 to 45% by weight based on the weight of the protein in the composition.

6. The process of claim 5 wherein the base is ammonium hydroxide.

7. The process of claim 1 wherein the particulate, non-heat coagulable simple protein material is keratin.

8. The process of claim 1 wherein the particulate, non-heat coagulable simple protein material is wheat gluten.

9. The process of claim 1 wherein the composition also contains a plasticizer in an amount sufficient to increase the flexibility of casing.

10. The process of claim 9 wherein the plasticizer is glycerol and the same is present in an amount of up to about 50% by weight of the protein.

11. The process of claim 1 wherein the flowable material is an aqueous dispersion.

12. The process of claim 1 wherein the plastic mass is heated to temperatures in the range of about 70 to 190° C. prior to the extrusion thereof and the gaseous medium is air at ambient room temperature and atmospheric pressure.

13. The process of claim 1 wherein the flowable material is introduced under pressure to cause the forming casing to expand laterally.

14. The process of claim 1 wherein the casing has an inner diameter of about 5 to 100 mm. and a wall thickness of about 0.25 to 50 mils.

15. The process of claim 1 wherein the particulate, non-heat coagulable protein material is gluten, the composition contains a reducing agent in an amount of about 0.1 to 5.0% by weight based on the weight of the protein, a base in an amount of about 0.1 to 45% by weight based on the weight of the protein and a plasticizer, the composition is heated to temperatures in the range of about 70 to 190° C., the gaseous medium is air at ambient room temperature and atmospheric pressure, the casing has an inner diameter of about 5 to 100 mm. and a wall thickness of about 0.25 to 50 mils and the flowable material is an edible aqueous emulsion.

16. The process of claim 15 wherein the reducing agent is sodium sulfite, the base is ammonium hydroxide, the plasticizer is glycerol and the edible aqueous emulsion is an emulsion comprising meat.

References Cited

UNITED STATES PATENTS

| | | | |
|---|---|---|---|
| 2,686,128 | 8/1954 | Conti | 99—176 X |
| 2,773,773 | 12/1956 | Harder et al. | 99—176 |
| 2,872,763 | 2/1959 | Meissner | 53—29 |

HYMAN LORD, Primary Examiner

U.S. Cl. X.R.

99—176